United States Patent [19]
Kusakabe et al.

[11] Patent Number: 5,142,914
[45] Date of Patent: Sep. 1, 1992

[54] PIEZOELECTRIC PRESSURE SENSOR

[75] Inventors: Hiroki Kusakabe, Osaka; Masuo Takigawa, Ikoma, both of Japan

[73] Assignee: Matsushita Electric Industrial Co., Ltd., Osaka, Japan

[21] Appl. No.: 604,211

[22] Filed: Oct. 29, 1990

[30] Foreign Application Priority Data

Nov. 2, 1989 [JP] Japan .................................. 1-287002

[51] Int. Cl.$^5$ .......................... G01L 7/08; G01L 9/08
[52] U.S. Cl. ................................ 73/723; 73/DIG. 4; 73/115; 73/756; 73/431
[58] Field of Search ........... 73/727, 723, 754, DIG. 4, 73/115, 756, 431; 338/4

[56] References Cited

U.S. PATENT DOCUMENTS

| | | | |
|---|---|---|---|
| 2,216,966 | 10/1940 | Swift | 310/338 |
| 2,917,642 | 12/1959 | Wright et al. | 73/115 |
| 3,672,223 | 6/1972 | Spescha | 73/723 |
| 3,743,869 | 7/1973 | Hugli | 310/8.4 |

FOREIGN PATENT DOCUMENTS

| | | |
|---|---|---|
| 1031155 | 6/1953 | France . |
| 63-109342 | 5/1988 | Japan . |
| 434802 | 10/1967 | Switzerland . |

Primary Examiner—Donald O. Woddiel
Attorney, Agent, or Firm—Stevens, Davis, Miller & Mosher

[57] ABSTRACT

A piezoelectric pressure sensor is provided with a sensor housing including an inner sensor housing, accommodating an piezoelectric element, and an outer sensor housing threaded to a test article. The inner sensor housing is attached to the outer sensor housing in such a manner that a prestress applied to the piezoelectric element does not change due to an axial strain in the outer sensor housing. The axial strain is produced when the outer sensor housing is mounted to a test article.

10 Claims, 3 Drawing Sheets

PIEZOELECTRIC PRESSURE SENSOR

BACKGROUND OF THE INVENTION

The present invention relates to a piezoelectric pressure sensor and more particularly but not exclusively relates to a piezoelectric pressure sensor suitable for detecting combustion pressure within a cylinder of the internal combustion engine, for example.

The piezoelectric pressure sensor utilizing piezoelectric effect in which electric charges are generated by applying stress has been widely used. Recently, a piezoelectric pressure sensor suitable for detecting combustion pressure within a cylinder of the internal combustion engine has been intensively developed.

FIG. 3 is an axial section of a piezoelectric pressure sensor disclosed in Japanese Patent Unexamined Publication No. 63-109342. The piezoelectric pressure sensor is of the type in which a shearing stress is applied to a piezoelectric element 24 thereof. The piezoelectric element 24 is arranged within a sensor housing 21. The piezoelectric element 24 is secured and prestressed in such a manner that the piezoelectric element 24 is urged by a fastening screw member 25 against a pressure receiving surface 22 through a pressure transmitting member 23. The pressure is necessary for measuring negative pressure particularly in measuring combustion pressure within a cylinder of the internal combustion engine. The pressure applied to the pressure receiving surface 22 is transmitted to an inner circumferential portion of the piezoelectric element 24 through the pressure transmitting member 23 which is electrically insulated from the sensor housing 21. In this event, a shearing stress is produced in the piezoelectric element 24 since the piezoelectric element 24 is held at an upper outer circumferential portion thereof by the upper fastening screw 25. Thus, electric charges are generated in the inner and outer circumferential surfaces of the piezoelectric element 24 according to the shearing stress, and the electric charges are detected as an electric signal from electrodes provided on the inner and outer circumferential surfaces. The piezoelectric pressure sensor with such a construction is advantageous in that it has a simple structure. However, when the piezoelectric pressure sensor is threaded to a test article 32, tensile stresses are produced in the flange of the sensor housing 21 in proportion to a tightening force of the sensor housing 21 to the test article 32 with tensile stresses generated as shown in FIG. 4, so that the distance between the pressure receiving surface 22 and the upper fastening screw 25 is enlarged. As a result, the prestress applied to secure or fix the piezoelectric element 24 is rather reduced, and hence contacts between the pressure transmitting member 23 and the piezoelectric element 24 and between the piezoelectric element 24 and the fastening screw 25 become unstable. This causes the pressure in the pressure receiving surface 22 to be nonuniformly transmitted or little transmitted to the piezoelectric element 24, resulting in a considerable fluctuation of the sensor output. Moreover, the sensor output is adversely affected since the piezoelectric element rather changes in piezoelectric constant according to the magnitude of the prestress.

SUMMARY OF THE INVENTION

Accordingly, it is an object of the present invention to provide a piezoelectric pressure sensor which is capable of generating no change in the prestress while securing the piezoelectric element, thereby producing a stable output.

In view of this and other objects in view, the present invention provides a piezoelectric pressure sensor of the type in which electric charges generated by applying a dynamic stress to a piezoelectric element are detected. The piezoelectric pressure sensor includes: an outer sensor housing including screwing means for screwing the outer sensor housing to a test article in which pressure is to be measured; and an inner sensor housing, adapted to be arranged within the outer sensor housing, for housing the piezoelectric element. The piezoelectric pressure sensor further comprises securing means for securing the inner sensor housing to the outer sensor housing. The inner sensor housing includes: a pressure receiving surface adapted to be subjected to the pressure in the test article; pressure transmitting means for transmitting the pressure, applied to the pressure receiving surface, to the piezoelectric element; and prestress applying means for urging the piezoelectric element against the pressure transmitting means to apply an axial prestress to the piezoelectric element.

DETAILED DESCRIPTION OF THE PREFERRED EMBODIMENT

Figure 1:
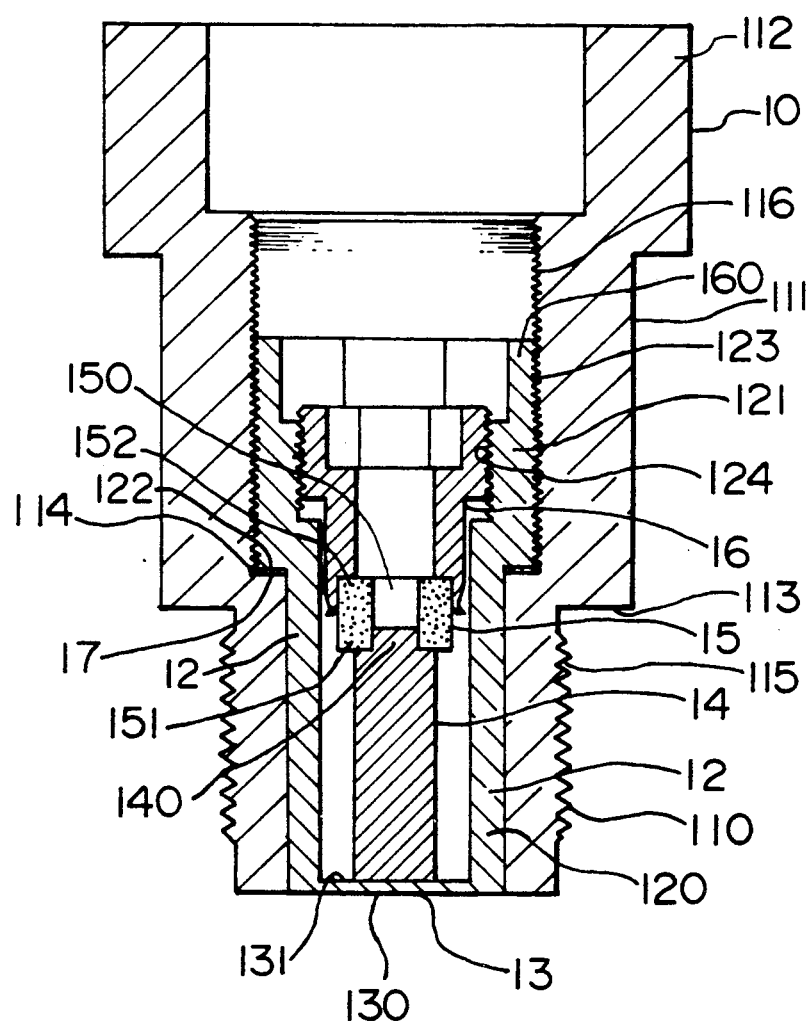
FIG. 1 is an axial cross-sectional view of a piezoelectric pressure sensor according to an embodiment of the present invention.

Referring to FIG. 1, a piezoelectric pressure sensor according to an embodiment of the present invention will be described. The piezoelectric pressure sensor includes a substantially hollow cylindrical, outer sensor housing 10 and inner sensor housing 12. The inner sensor housing 12 is fitted in the outer sensor housing 10.

The outer sensor housing 10 includes a screwing portion 110, an intermediate portion 111 enlarged in outer diameter than the screwing portion 110 and a largest diameter portion 112. The screwing portion 110, the intermediate portion 111 and the largest diameter portion 112 are formed integrally and coaxially. Between the screwing portion 110 and intermediate portion 111, an outer annular shoulder 113 is formed in an outer surface of the outer sensor housing 10 while an inner annular shoulder 114 is formed in an inner surface of the outer sensor housing 10. The screwing portion 110 is provided with a screw thread 115 formed in an outer surface thereof.

The inner sensor housing 12 has a sensing portion 120 and a proximal portion 121 coaxially integrally formed with the sensing portion 120. An outer annular shoulder 12 is formed in an outer surface of the inner sensor housing 12 between the sensing portion 120 and proximal portion 121. The proximal portion 121 is provided in an outer surface thereof with a male screw thread 123, which tightly engages with a female screw thread 116 formed in an inner surface of the intermediate portion 111 so that an annular sealing member 17 is clamped between the inner annular shoulder 114 of the outer sensor housing 10 and the outer annular shoulder 122 of the inner sensor housing 12 for hermetical sealing. The sensing portion 120 is slidably fitted into the screwing portion 110 of the outer sensor housing 11 (FIG. 2) and is not fixed to the screwing portion 110. Thus, the sensing portion 120 is capable of axially moving without any change in axial length when axial strains are produced in the outer sensor housing 11, particularly in the intermediate portion 111 when mounting to a test article. A pressure receiving bottom wall 13 is provided to a tip of the inner sensor housing 12 to be exposed at an outer surface 130 thereof to pressure to be measured. An elongated pressure transmitting member 14 is arranged to contact at one end thereof to an inner surface of the pressure receiving bottom wall 13 through a thin electrical insulation layer 131 such as made of Teflon (the trademark for polytetrafluoroethylene). The pressure transmitting member 14 may be made of an electrically insulating material such as a structural ceramic. The pressure transmitting member 14 is provided in the other end thereof with a diameter reduced portion 140 coaxial with the one end. A hollow cylindrical piezoelectric element 15 fits at a lower inner circumferential portion 151 around the diameter reduced portion 140 of the pressure transmitting member 14. The piezoelectric element 15 has a polarization axis along the axis thereof and is provided in respective inner and outer circumferential surfaces with electrodes (not shown). A fastening screw member 16 fits around an upper outer circumferential portion 152 of the piezoelectric element 15. The fastening screw member 16 is threaded at a head portion 160 thereof to an inner cirumferential surface 124 of the proximal portion 121 for urging the piezoelectric element 15 against the pressure receiving bottom wall 13 through the pressure transmitting member 14 to provide a prestress to the piezoelectric element 15. In this manner, the piezoelectric element 15 and the pressure transmitting member 14 are secured to the inner sensor housing 12. The fastening screw member 16 is electrically connected to the electrodes, provided to the outer circumferential surface of the piezoelectric element 15, and serves as lead wires.

In the piezoelectric pressure sensor, pressure, applied to the pressure receiving bottom wall 13 due to variation in pressure in a zone to be measured, is transmitted to the lower inner circumferential portion 151 of the piezoelectric element 15 through the pressure transmitting member 14. The piezoelectric element 15 is held at the upper outer circumferential portion 152 by the fastening screw member 16, and hence the pressure transmitted to the piezoelectric element 15 causes a shearing stress to be generated in the piezoelectric element 15, so that in proportion with the shearing stress, electric charges are generated in the electrodes of the piezoelectric element 15.

Figure 2:
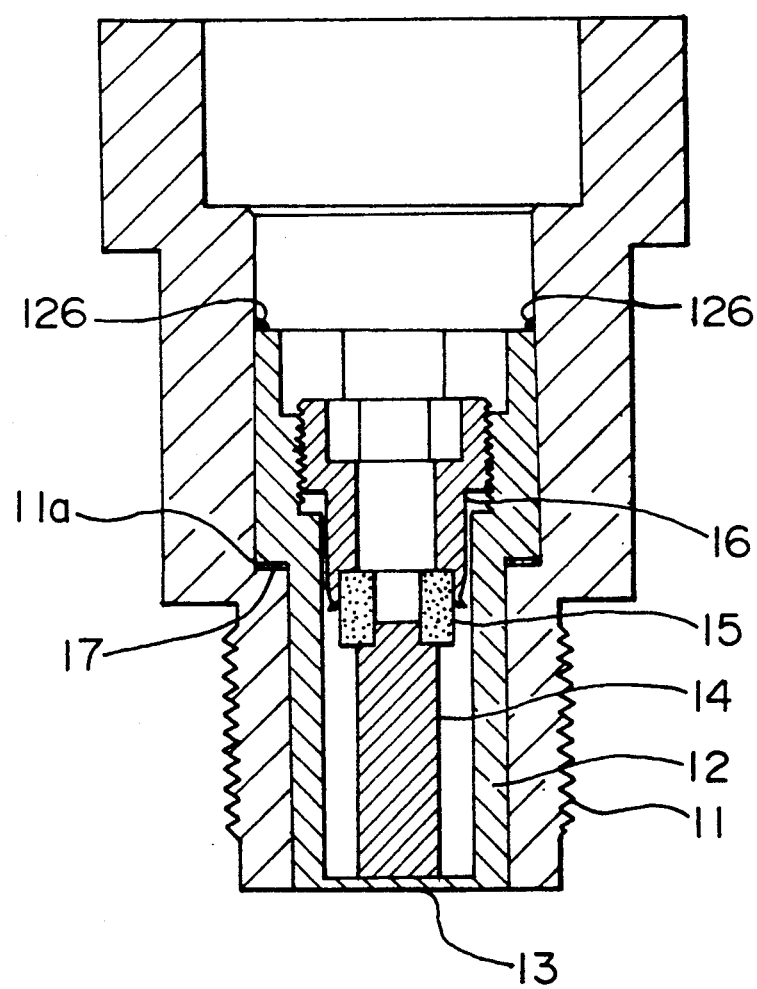
FIG. 2 is an axial cross-sectional view of a modified form of the piezoelectric pressure sensor of FIG. 1.
Figure 3:
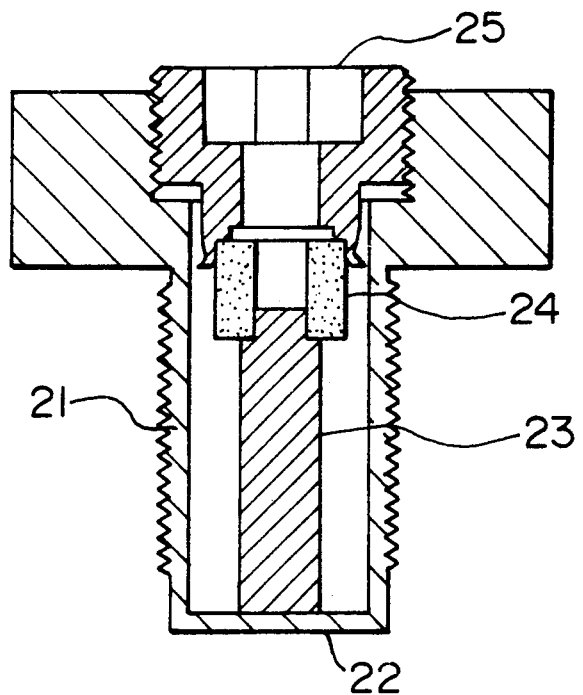
FIG. 3 is an axial cross-sectional view of the typical example of the conventional piezoelectric pressure sensor.
Figure 4:
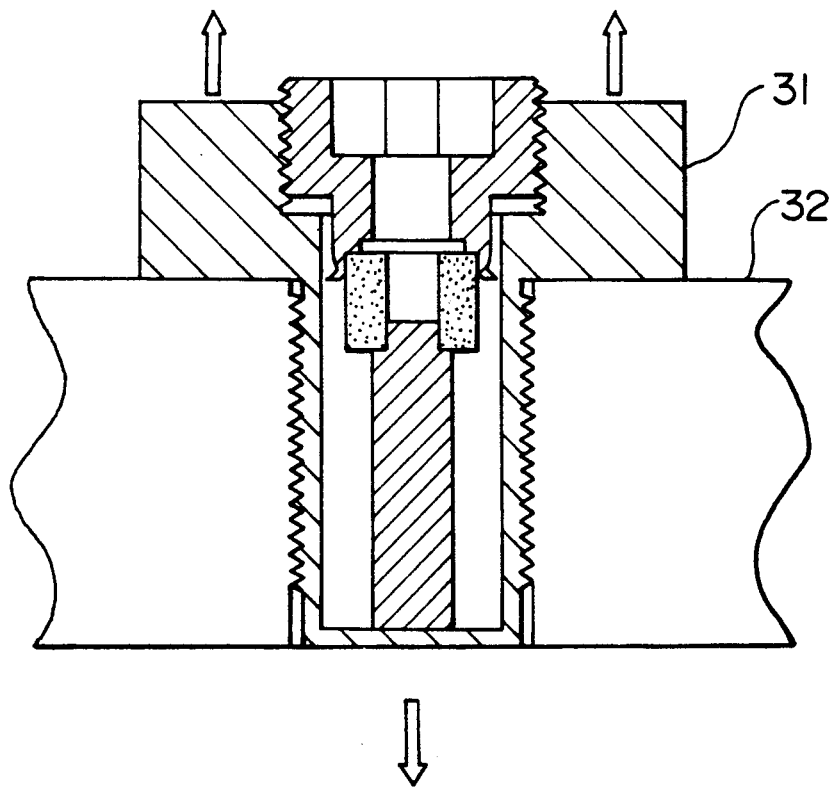
FIG. 4 is an axial cross-sectional view of the conventional piezoelectric pressure sensor mounted to the test article and illustrates a state in which tensile stresses are applied to the piezoelectric pressure sensor.

FIG. 2 illustrates a modified form of the piezoelectric pressure sensor of FIG. 1. In the modified piezoelectric pressure sensor, the proximal portion 121 of the inner sensor housing 12 is welded at an upper edge portion 126 thereof to the inner circumferential surface of the intermediate portion 111 of the outer sensor housing 10. Instead of welding, the proximal portion 121 may be brazed at the upper edge portion 126 to the intermediate portion 111. Such welding or brazing of the proximal portion 121 produces a similar effect as the screw thread engagement in the preceding embodiment.

The piezoelectric pressure sensor of the present invention does not produce any change in the prestress in the piezoelectric element 15 due to axial strains of the sensor housing as in the prior art and hence reduces fluctuation of the sensor output. The piezoelectric pressure sensor of this embodiment uses shearing stress to sense pressure and is hence advantageous in that the influence of the pyroelectric output, the piezoelectric element has, is fairly reduced.

Although the piezoelectric pressure sensor of a shear effect type using shearing stress is illustrated in the embodiment, it is possible to provide a piezoelectric pressure sensor utilizing stresses in the compression direction or the radial direction of the piezoelectric element.

The piezoelectric element may be made of a material containing a major proportion of lead titanate added with Mn 15 and La. Lead titanate provides excellent thermal resistance and a stable characteristic at high temperatures to the piezoelectric element. This piezoelectric element is enhanced in output characteristics at high temperature. When a piezoelectric element using shearing stress of the present invention is made of such a lead titanate material, a piezoelectric pressure sensor suitable for sensing pressure at high temperatures is provided.

What is claimed is:

1. A piezoelectric pressure sensor of the type in which electric charges generated by applying a dynamic stress to a piezoelectric element are detected, comprising:

an outer sensor housing having a substantially cylindrical shape, including a fitting portion adapted to fit into a test article, the fitting portion having an outer surface; a diameter enlarged portion coaxial with the fitting portion and having a larger outer diameter than that of the fitting portion, the diameter enlarged portion having an inner surface; an outer annular shoulder integrally formed with both the fitting portion and the diameter enlarged portion; and a screw thread formed in the outer surface of the fitting portion for engaging with the test article, the outer annular shoulder being adapted to be urged against the test article to generate axial stress therein when the screw thread is engaged to the test article;

an inner sensor housing for housing the piezoelectric element, said inner sensor housing including a sensor portion adapted to be arranged within the fitting portion of the outer sensor housing in a manner to be axially movable relative to the latter; a proximal portion coaxial with the sensor portion and located on a side of the outer annular shoulder of the outer sensor housing opposite to a side of the outer annular shoulder on which said pressure receiving surface is located; a pressure receiving surface adapted to be subjected to a pressure in the test article; pressure transmitting means for transmitting the pressure, applied to the pressure receiving surface, to the piezoelectric element; and prestress applying means for urging the piezoelectric element against the pressure transmitting means to apply an axial pressure to the piezoelectric element; and securing means arranged between the proximal portion of the inner sensor housing and the inner surface of the diameter enlarged portion of the outer sensor housing for securing the proximal portion of the inner sensor housing to the inner surface of the diameter enlarged portion.

2. A piezoelectric pressure sensor as recited in claim 1, wherein the securing means comprises a male screw thread, formed in the proximal portion of the inner sensor housing, and a female screw thread formed in the inner surface of the diameter enlarged portion of the outer sensor housing to engage the male screw.

3. A piezoelectric pressure sensor as recited in claim 2, wherein:
the proximal portion of the inner sensor housing is larger in outer diameter than the sensing portion thereof to form an annular outer shoulder;
the outer sensor housing comprises an inner shoulder adapted to engage with the outer shoulder of the inner sensor housing; and further comprising
a sealing member adapted to be interposed between the inner shoulder of the outer sensor housing and the outer shoulder of the inner housing for hermetically sealing the inner sensor housing.

4. A piezoelectric pressure sensor as recited in claim 1, wherein the securing means is a welded portion joining the proximal portion of the inner sensor housing to the inner surface of the diameter enlarged portion of the outer sensor housing.

5. A piezoelectric pressure sensor as recited in claim 4, wherein the securing means is a brazed portion joining the proximal portion of the inner sensor housing to the inner surface of the diameter enlarged portion of the outer sensor housing.

6. A piezoelectric pressure sensor as recited in claim 1, wherein the pressure applying means and the pressure transmitting means are adapted to support the piezoelectric element to produce a shearing stress in the piezoelectric element when the pressure is transmitted from the pressure transmitting means to the piezoelectric element, whereby electric charges generated due to the shearing stress are detected.

7. A piezoelectric pressure sensor as recited in claim 6, wherein:
the piezoelectric element is generally in the shape of a hollow cylinder and includes an inner peripheral portion and an outer peripheral portion;
the piezoelectric element is adapted to attach at the inner peripheral portion thereof to the pressure transmitting means and at the outer peripheral portion thereof to the pressure applying means;
the inner sensor housing has an inner surface; and
the pressure applying means is threaded to the inner surface or the inner sensor housing for applying the prestress to the piezoelectric element.

8. A piezoelectric pressure sensor as recited in claim 7, wherein:
the outer sensor housing has a substantially hollow cylindrical shape and comprises:
a fitting portion adapted to fit into the test article, the fitting portion having an outer surface;
a diameter enlarged portion being coaxial with the fitting portion and being larger in outer diameter than the fitting portion, the diameter enlarged portion having an inner surface; and
an outer annular shoulder integrally formed with both the fitting portion and the diameter enlarged portion;
the screwing means is a screw thread formed in the outer surface of the fitting portion for engaging with the test article;
the outer annular shoulder is adapted to be urged against the test article to generate axial tensile stresses therein when the screw thread is engaged to the test article;
the inner sensor housing comprises:
a sensing portion adapted to fit into the fitting portion of the outer sensor housing for axial movement; and
a proximal portion being coaxial with the sensing portion of the inner sensor housing; and
the securing means is arranged between the proximal portion of the inner sensor housing and the inner surface of the diameter enlarged portion of the outer sensor housing for securing the proximal portion to the inner surface of the diameter enlarged portion.

9. A piezoelectric pressure sensor as recited in claim 8, wherein the securing means comprises a male screw thread, formed in the proximal portion of the inner sensor housing, and a female screw thread formed in the inner surface of the diameter enlarged portion of the outer sensor housing to engage with the male screw.

10. A piezoelectric pressure sensor as recited in claim 1, wherein the piezoelectric element is made of a material containing a lead titanate.

* * * * *